(12) United States Patent
Lee et al.

(10) Patent No.: US 9,107,214 B2
(45) Date of Patent: Aug. 11, 2015

(54) METHOD OF HANDLING HYBRID AUTOMATIC REPEAT REQUEST ACKNOWLEDGEMENT RESPONSES IN WIRELESS COMMUNICATION SYSTEM

(71) Applicant: Industrial Technology Research Institute, Hsinchu (TW)

(72) Inventors: Chien-Min Lee, Hsinchu County (TW); Chia-Pang Yen, Hsinchu County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 167 days.

(21) Appl. No.: 13/728,995

(22) Filed: Dec. 27, 2012

(65) Prior Publication Data

US 2013/0176917 A1     Jul. 11, 2013

Related U.S. Application Data

(60) Provisional application No. 61/583,614, filed on Jan. 6, 2012.

(51) Int. Cl.
| | | |
|---|---|---|
| H04W 4/00 | (2009.01) | |
| H04W 72/04 | (2009.01) | |
| H04L 1/18 | (2006.01) | |
| H04W 76/00 | (2009.01) | |

(52) U.S. Cl.
CPC ......... *H04W 72/0446* (2013.01); *H04L 1/1861* (2013.01); *H04W 72/044* (2013.01); *H04W 72/0453* (2013.01); *H04W 76/00* (2013.01)

(58) Field of Classification Search
None
See application file for complete search history.

(56) References Cited

U.S. PATENT DOCUMENTS

| | | |
|---|---|---|
| 8,165,066 B2 | 4/2012 | Tseng |
| 8,276,035 B1 | 9/2012 | Savarese |
| 8,681,718 B2 | 3/2014 | Chun |
| 2006/0251015 A1 | 11/2006 | Khan |
| 2007/0177569 A1 | 8/2007 | Lundby |
| 2008/0084825 A1 | 4/2008 | Lee |
| 2009/0201863 A1* | 8/2009 | Pi ................................. 370/329 |
| 2009/0201872 A1 | 8/2009 | Gorokhov |
| 2009/0207771 A1 | 8/2009 | Lindskog |

(Continued)

FOREIGN PATENT DOCUMENTS

| | | |
|---|---|---|
| CN | 1741631 A | 3/2006 |
| CN | 101351981 A | 1/2009 |

(Continued)

OTHER PUBLICATIONS

Chen et al., "An Adaptive HARQ Algorithm in MIMO Systems", 2009 IEEE, pp. 2012-2015, 2009.

(Continued)

*Primary Examiner* — Kodzovi Acolatse
(74) *Attorney, Agent, or Firm* — Winston Hsu; Scott Margo

(57) ABSTRACT

A method of handling hybrid automatic repeat request (HARQ) acknowledgement responses in a network of a wireless communication system is disclosed. The method comprises assigning resources for a plurality of physical hybrid indicator channels (PHICHs) and a plurality of extended physical hybrid indicator channels (ePHICHs); and transmitting a HARQ acknowledgement response to a communication device of the wireless communication system on a channel selected from the plurality of PHICHs and the plurality of ePHICHs, after receiving an uplink transmission from the communication device.

44 Claims, 9 Drawing Sheets

(56) References Cited

U.S. PATENT DOCUMENTS

| | | | |
|---|---|---|---|
| 2009/0245187 A1* | 10/2009 | Nam et al. | 370/329 |
| 2010/0031110 A1 | 2/2010 | Seok | |
| 2010/0040127 A1 | 2/2010 | Wen | |
| 2010/0110964 A1 | 5/2010 | Love | |
| 2010/0265898 A1 | 10/2010 | Chun | |
| 2011/0032925 A1 | 2/2011 | Lee | |
| 2011/0044278 A1 | 2/2011 | Astely | |
| 2011/0090825 A1 | 4/2011 | Papasakellariou | |
| 2011/0170499 A1* | 7/2011 | Nayeb Nazar et al. | 370/329 |
| 2011/0205980 A1 | 8/2011 | Prakash | |
| 2012/0320853 A1 | 12/2012 | Kwon | |
| 2013/0003673 A1* | 1/2013 | Dinan | 370/329 |
| 2013/0039299 A1* | 2/2013 | Papasakellariou et al. | 370/329 |
| 2013/0040578 A1* | 2/2013 | Khoshnevis et al. | 455/67.11 |
| 2013/0083750 A1* | 4/2013 | Nazar et al. | 370/329 |
| 2013/0148580 A1 | 6/2013 | Han | |
| 2013/0235812 A1* | 9/2013 | Heo et al. | 370/329 |
| 2014/0079032 A1 | 3/2014 | Bergström | |

FOREIGN PATENT DOCUMENTS

| | | |
|---|---|---|
| CN | 101465720 A | 6/2009 |
| CN | 101480070 A | 7/2009 |
| CN | 101741462 A | 6/2010 |
| CN | 102017504 A | 4/2011 |
| WO | 2011076150 A1 | 6/2011 |
| WO | 2011085195 A1 | 7/2011 |

OTHER PUBLICATIONS

Panasonic, "Proposal of bit mapping for type-III HARQ", TSG-RAN Working Group 1 Meeting#18, TSGR1#18 (01)0031, Jan. 15-18, 2001.

Soundararajan et al., "An Efficient HARQ Retransmission Algorithm in OFDMA Based Wireless Networks", 2009 IEEE, pp. 88-93, Mar. 15-17, 2009.

ETSI TS 136 211 V10.3.0 (3GPP TS 36.211 version 10.3.0 Release 10), Oct. 2011.

Pantech, "Discussion on ePHICH to support UL HARQ process", 3GPP TSG RAN Working Group 1 Meeting #66bis R1-113105, Zhuhai, China, Oct. 10-14, 2011, p. 1-3.

Telesystem Innovations, "LTE in a Nutshell: The Physical Layer", White Paper, 2010 Telesystem Innovations Inc., p. 1-18.

3rd Generation Partnership Project, "3GPP TS 36.211 V10.4.0", Technical Specification Group Radio Access Network; Evolved Universal Terrestrial Radio Access (E-UTRA); Physical Channels and Modulation (Rlease 10), http://www.3gpp.org/dynareport/36211. htm, Dec. 22, 2011, coverpage, p. 2-5, 68-73.

* cited by examiner

METHOD OF HANDLING HYBRID AUTOMATIC REPEAT REQUEST ACKNOWLEDGEMENT RESPONSES IN WIRELESS COMMUNICATION SYSTEM

CROSS REFERENCE TO RELATED APPLICATIONS

This application claims the benefit of U.S. Provisional Application No. 61/583,614, filed on Jan. 6, 2012, entitled "Method for assigning HARQ-ACK resource and Apparatus using the same", the contents of which are incorporated herein in their entirety.

BACKGROUND OF THE INVENTION

1. Field of the Invention

The application relates to a method utilized in a wireless communication system, and more particularly, to a method of handling hybrid automatic repeat request acknowledgement responses in a wireless communication system.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In the LTE-A system, since the advanced techniques are supported, such as new carrier type, frequency domain inter cell interference coordination (ICIC), spatial reuse of the resources in coordinated CoMP transmission and downlink MIMO, enhanced physical downlink channels (ePDCCHs) are provided to improve the related abilities. An obvious case is the heterogeneous network scenarios, where the ePDCCHs could be coordinated to avoid interference between macro and low power nodes. In a shared cell scenario, spatial reuse for the same enhanced control channel resource and a downlink transmission on a packet downlink shared channel (PD-SCH) within the cell is possible, which provides higher spectrum efficiency. In the CoMP, the uplink transmission will also benefit from the cell splitting gains, which will lead to a problem of collisions between physical indicator channels (PHICH). Therefore, it is natural to consider another type control channel, such as enhanced PHICHs (ePHICH), which is able to accompany the ePDCCH to support frequency domain ICIC and spatial reuse within the cell and capable of operating as PHICH operation.

Moreover, when considering the new carrier type which has reduced overhead of legacy of control signaling and cell-specific reference signal (CRS), the use of PHICHs may not be possible. Therefore, the ePHICH design is necessary for the new carrier type and should have the same capacity as the PHICH design.

SUMMARY OF THE INVENTION

The present invention therefore provides a method for handling hybrid automatic repeat request acknowledgement responses in a wireless communication system, to improve the capacity of acknowledgement transmissions.

A method of handling hybrid automatic repeat request (HARQ) acknowledgement responses in a network of a wireless communication system is disclosed. The method comprises assigning resources for a plurality of physical hybrid indicator channels (PHICHs) and a plurality of extended physical hybrid indicator channels (ePHICHs); and transmitting a HARQ acknowledgement message to a communication device of the wireless communication system on a channel selected from the plurality of PHICHs and the plurality of ePHICHs, after receiving an uplink transmission from the communication device.

A method of handling hybrid automatic repeat request (HARQ) acknowledgement responses in a communication device of a wireless communication system is disclosed. The method comprises receiving a configuration of a plurality of PHICHs and a plurality of ePHICHs from a network of the wireless communication system; triggering an uplink transmission; and receiving a HARQ acknowledgement message corresponding to the uplink transmission and transmitted from the network on a channel of the plurality of PHICHs and the plurality of ePHICHs according to the configuration.

A communication apparatus for a wireless communication system is disclosed. The communication apparatus comprises a processing means; a storage unit; and a program code, stored in the storage unit, wherein the program code instructs the processing unit to execute the following steps: assigning resources for a plurality of physical hybrid indicator channels (PHICHs) and a plurality of extended physical hybrid indicator channels (ePHICHs); and transmitting a HARQ acknowledgement message to a communication device of the wireless communication system on a channel selected from the plurality of PHICHs and the plurality of ePHICHs, after receiving an uplink transmission from the communication device.

A communication apparatus for a wireless communication system is disclosed. The communication apparatus comprises a processing means; a storage unit; and a program code, stored in the storage unit, wherein the program code instructs the processing unit to execute the following steps: receiving a configuration of a plurality of PHICHs and a plurality of ePHICHs from a network of the wireless communication system; triggering an uplink transmission; and receiving a HARQ acknowledgement message corresponding to the uplink transmission and transmitted from the network on a channel of the plurality of PHICHs and the plurality of ePHICHs according to the configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
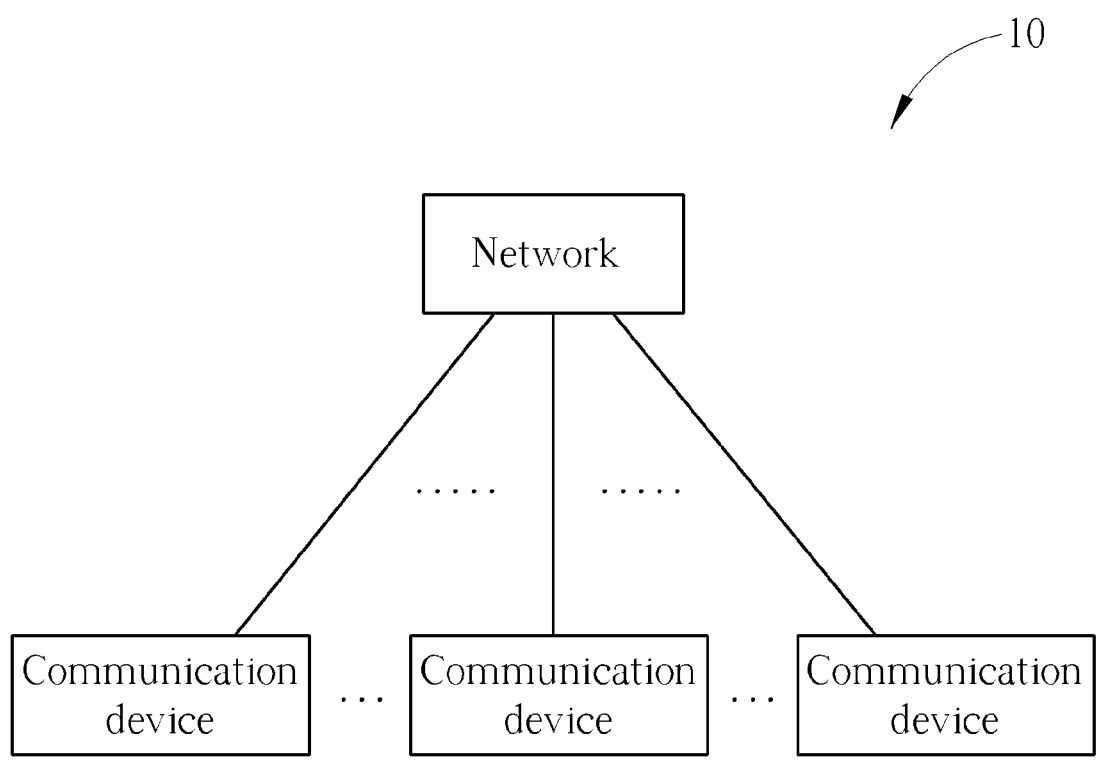
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The communication devices can be mobile communication devices such as user equipments for performing speech and data communication through the network such as the UMTS, the LTE system or the LTE-A system. Besides, the network and one of the communication devices can be seen as a transmitter or a receiver according to transmission direction, e.g., for an uplink (UL), the one of the communication devices is the transmitter and the network is the receiver, and for a downlink (DL), the network is the transmitter and the one of the communication devices is the receiver.

Figure 2:
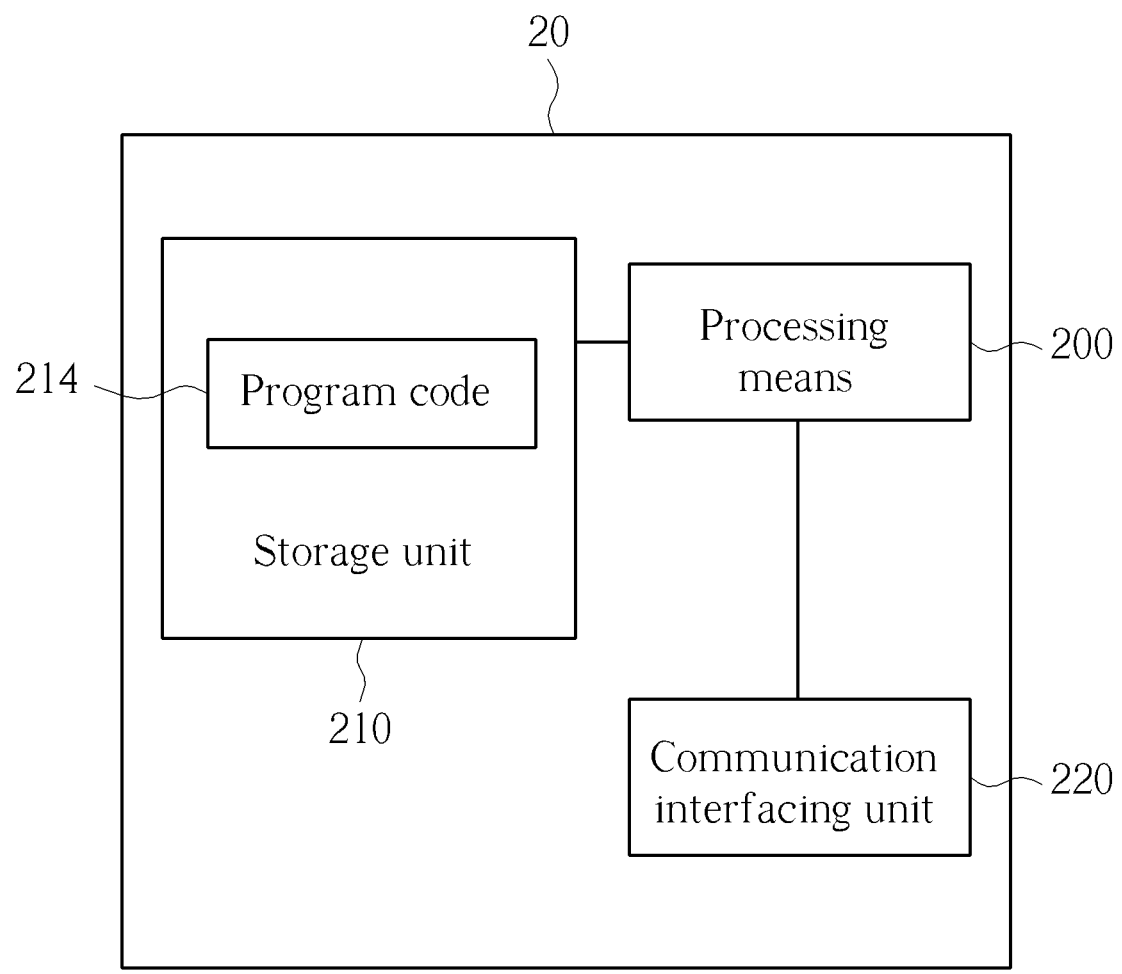
FIG. 2 is a schematic diagram of a communication apparatus according to an example of the present invention.

Please refer to FIG. 2, which is a schematic diagram of a communication apparatus 20 according to an example of the present invention. The communication apparatus 20 can be the network or one of the communication devices shown in FIG. 1, but is not limited herein. The communication apparatus 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
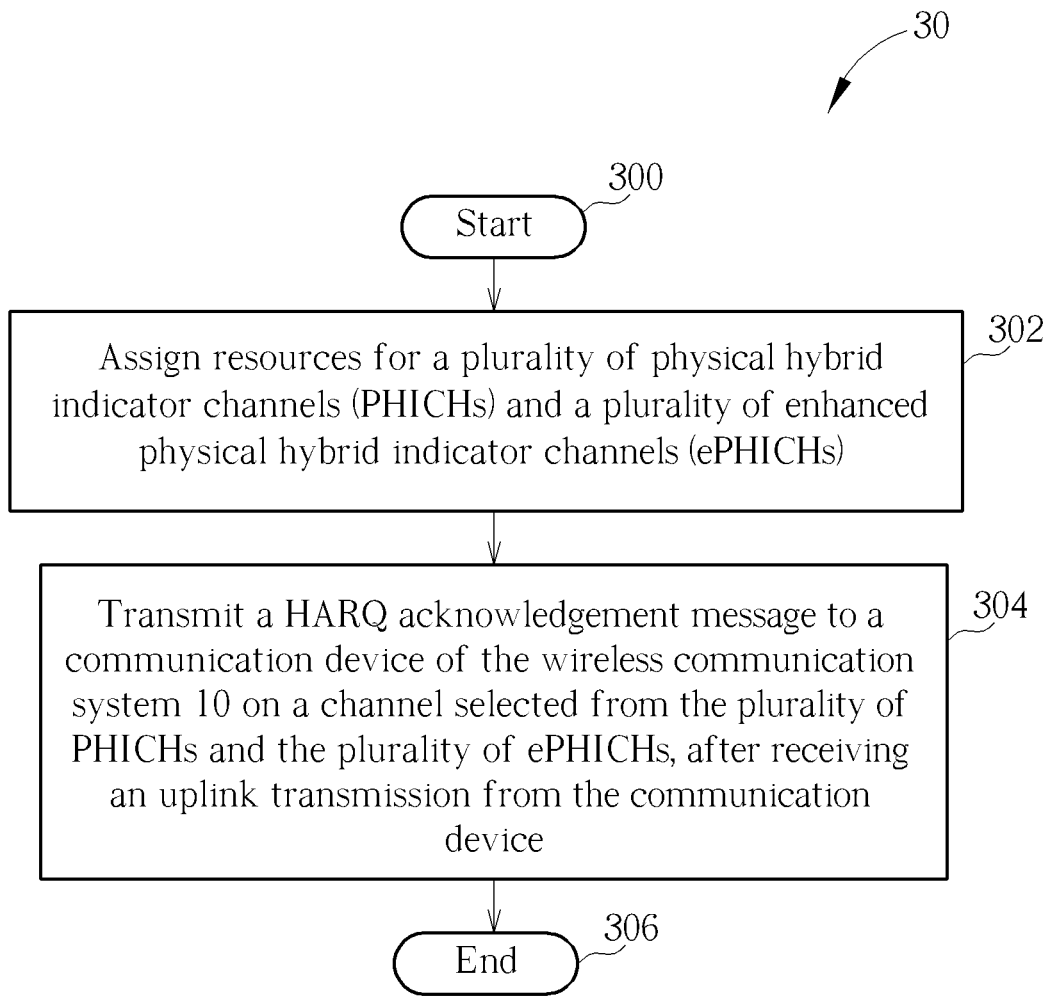
FIG. 3 is a flowchart of a process according to an example of the present invention.

Please refer to FIG. 3, which is a flowchart of a process 30 according to an example of the present invention. The process 30 is utilized in the wireless communication system 10 shown in FIG. 1, for handling hybrid automatic repeat request (HARQ) acknowledgement responses in the network. The HARQ acknowledgement responses represent positive or negative HARQ acknowledgement responses, which should be well-known in this art. The process 30 can be utilized in the network and may be compiled into the program code 214. The process 30 includes the following steps:

Step 300: Start.

Step 302: Assign resources for a plurality of physical hybrid indicator channels (PHICHs) and a plurality of enhanced physical hybrid indicator channels (ePHICHs).

Step 304: Transmit a HARQ acknowledgement message to a communication device of the wireless communication system 10 on a channel selected from the plurality of PHICHs and the plurality of ePHICHs, after receiving an uplink transmission from the communication device.

Step 306: End.

According to the process 30, the network assigns the resources for the plurality of PHICHs and the plurality of ePHICHs. If the network receives an uplink transmission from a communication device, the network transmits a HARQ acknowledgement message to the communication device on a channel selected from the plurality of PHICHs and the plurality of ePHICHs. The plurality of ePHICHs are provided to handle the HARQ acknowledgement responses; thus, the capacity of acknowledgement transmissions and the rate of the uplink transmissions are improved.

Note that, the process 30 is an example of the present invention. Those skilled in the art should readily make combinations, modifications and/or alterations on the abovementioned description and examples. For example, the uplink transmission may be granted by downlink control information (DCI) which is allocated in control channels such as physical downlink control channels (PDCCH) or enhanced physical downlink control channels (ePDCCH).

Figure 4A:
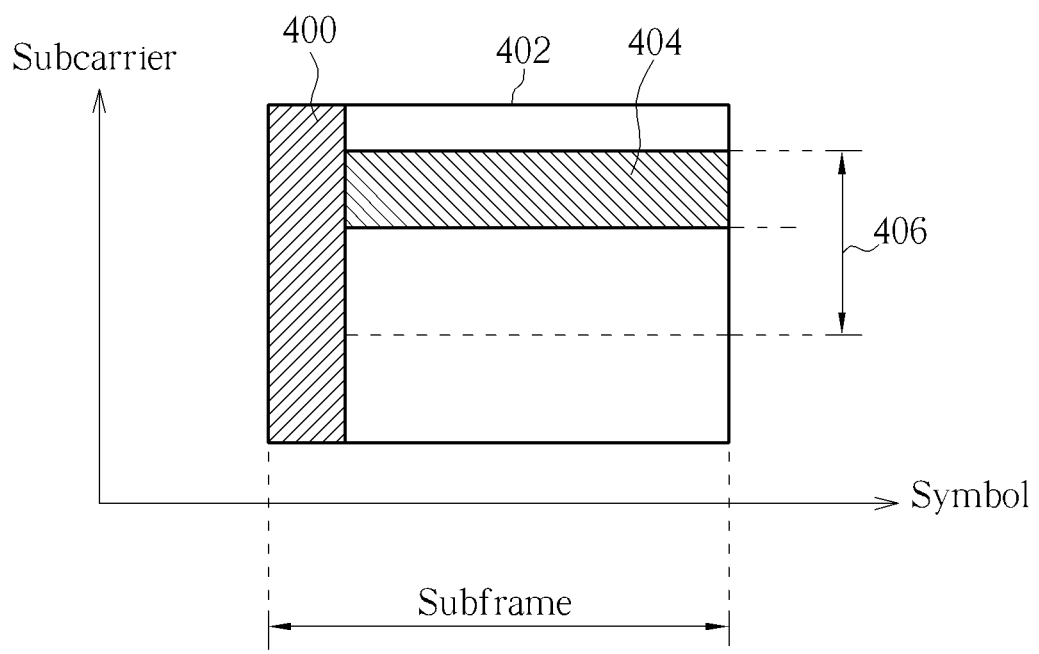
FIG. 4A-4C is a schematic diagram of resource assignment according to an example of the present invention.
Figure 4B:
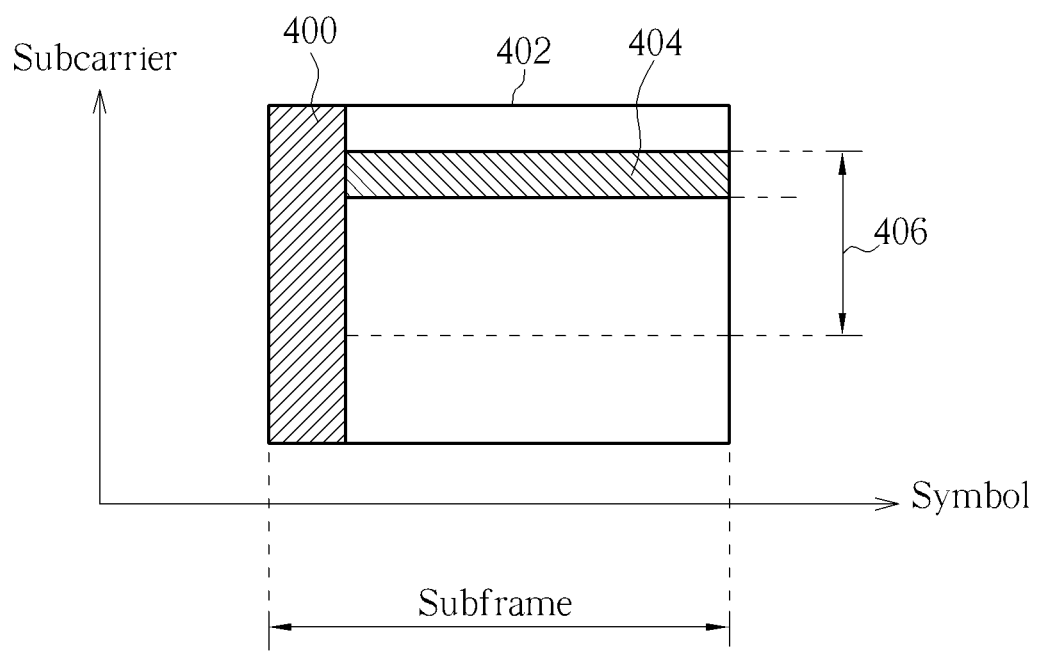
Figure 4C:
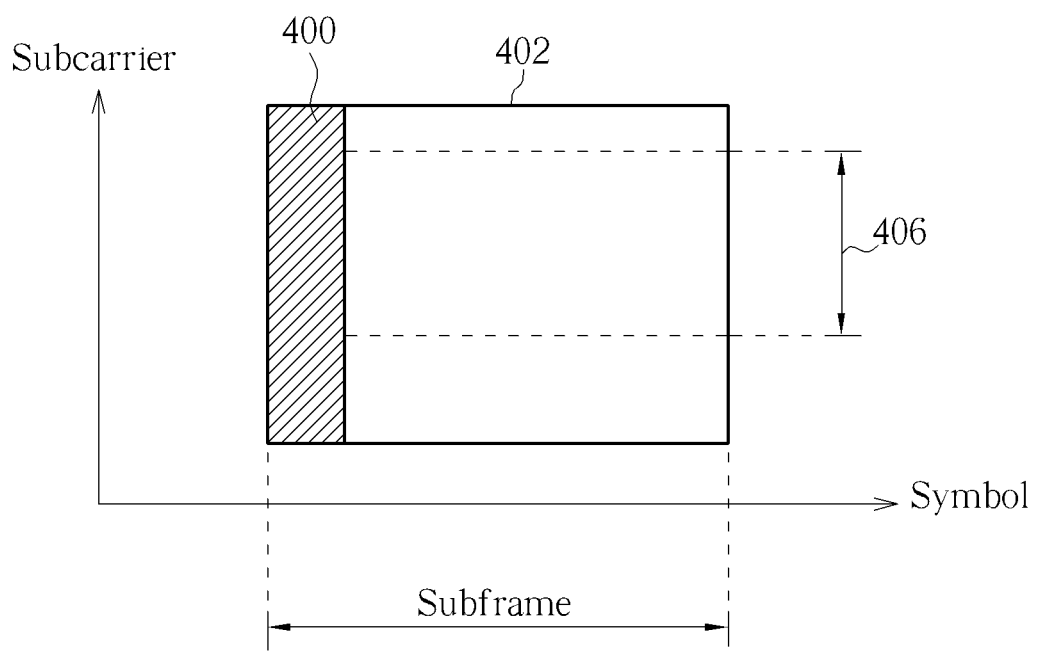

Please refer to the FIG. 4A-4C, which is a schematic diagram of resource assignment according to an example of the present invention. In FIG. 4A-4C, a region 400 is assigned to original PHICHs of the network and the resources for the plurality of PHICHs are assigned in the region 400. A region 402 is assigned to an original physical downlink shared channel (PDSCH) of the network and the resources for the plurality of ePHICHs are assigned in a part of the region 402 as a region 406. A region 404 in the region 406 is allocated as the actual resources utilized for carrying the HARQ acknowledgement message. In such a condition, the actual amount of the resources capable of transmitting the HARQ acknowledgement message via the plurality of ePHICHs is smaller than the total amount of the resources assigned, such that the usage of the plurality of ePHICHs would not affect a downlink transmission on the PDSCH. In brief, when a large number of HARQ acknowledgement resources are required, the actual amount of the resources capable of transmitting the HARQ acknowledgement message via the plurality of ePHICHs would be increased, as shown in FIG. 4A. On the contrary, when a small number of HARQ acknowledgement resources are required, the actual amount of the resources capable of transmitting the HARQ acknowledgement message via the plurality of ePHICHs would be decreased, as shown in FIG. 4B. Even when the resources of the plurality of PHICH are enough to handle the HARQ acknowledgement transmission, the resources configured to the plurality of ePHICH are retrieved for the downlink transmission, as shown in FIG. 4C. As such, the region 404 can be flexibly adjusted according to the amount of the HARQ acknowledgement resources and the resources configured in the region 406 except the resources in the region 404 can be retrieved for the downlink transmission.

Figure 5:
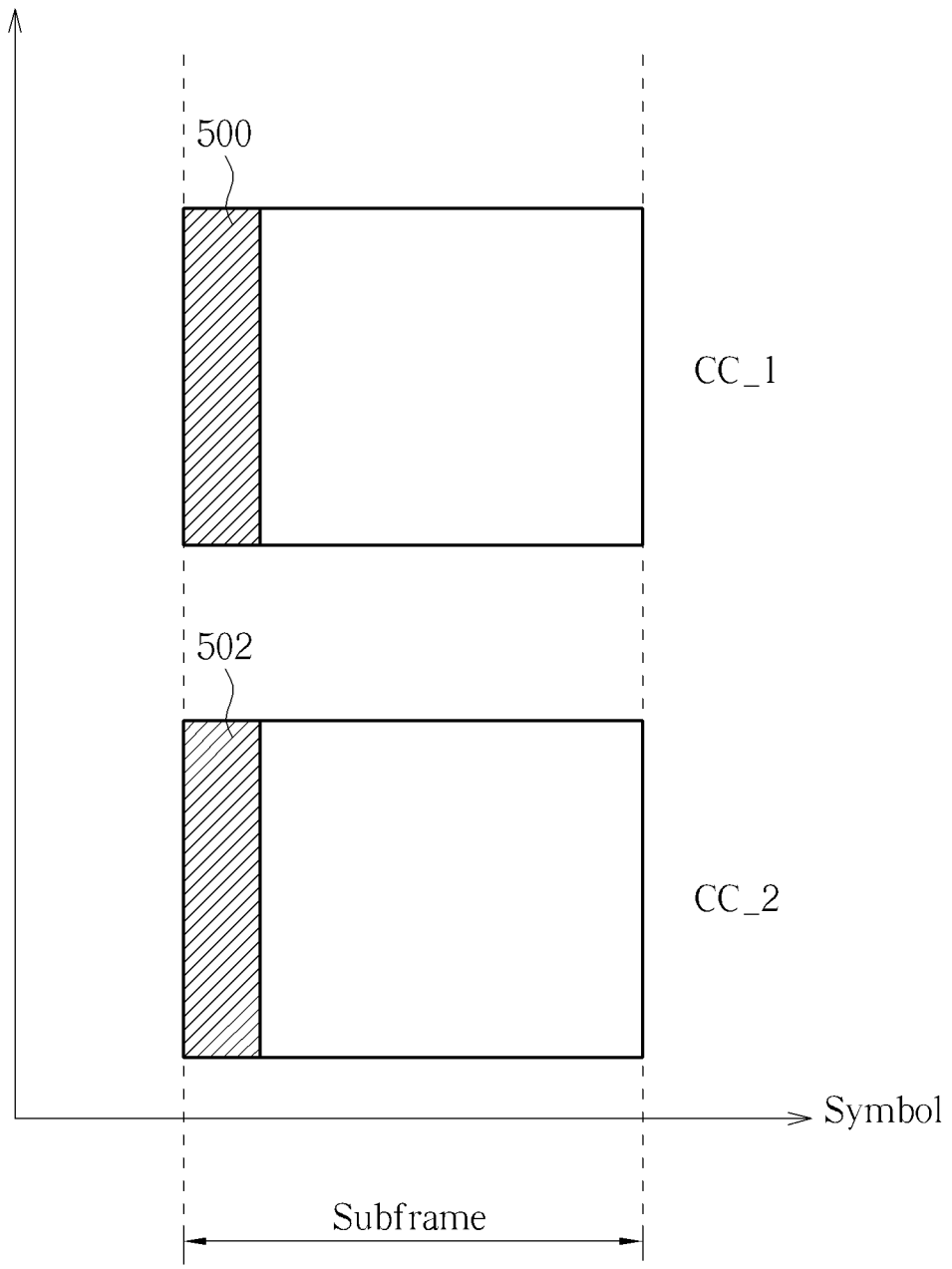
FIG. 5 is a schematic diagram of resource assignment according to an example of the present invention.

In addition, when the network supports carrier aggregation (CA) with a first component carrier CC_1 and a second component carrier CC_2 configured, where the first component carrier CC_1 and the second component carrier CC_2 have different frequencies, the resources for the plurality of PHICHs and the plurality of ePHICHs are assigned to the first component carrier CC_1 and can be separately assigned according to resources of the first component carrier CC_1 and resources of the second component carrier CC_2. Note that, the number of component carriers is set to be 2 for simplicity, but not limited herein. Please refer to FIG. 5, which is a schematic diagram of resource assignment according to an example of the present invention. A region 500 is assigned to original PHICHs of the first component carrier CC_1 and the resources for the plurality of PHICHs are assigned in the region 500. A region 502 is assigned to original PHICHs of the second component carrier CC_2 and the resources for the plurality of ePHICHs are assigned in the region 502. In other words, the resources for the plurality of PHICHs are assigned as resources for a plurality of PHICHs of the first component carrier CC_1 and the resources for the plurality of ePHICHs are assigned as resources for a plurality of PHICHs of the second component carrier CC_2.

Figure 6:
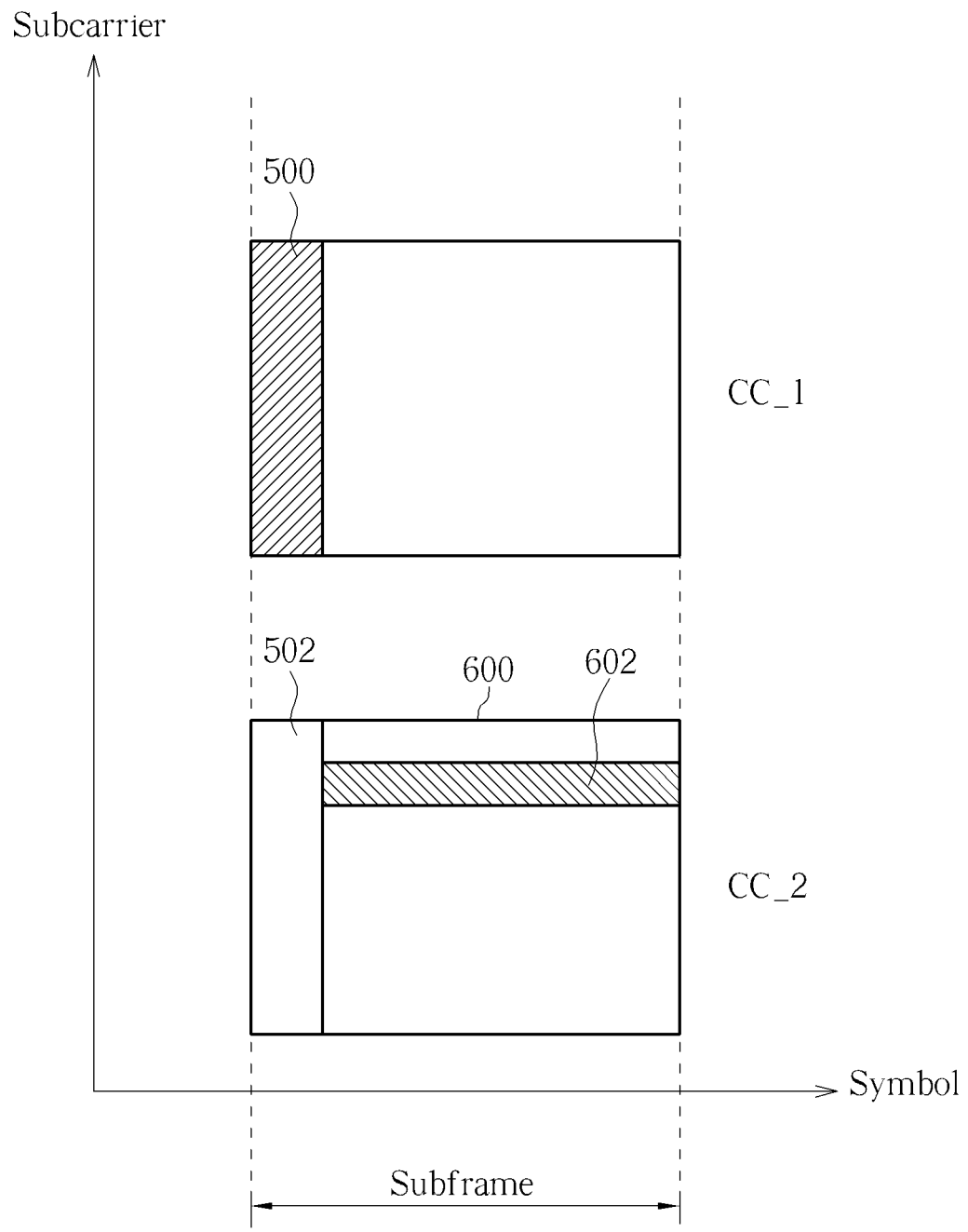
FIG. 6 is a schematic diagram of resource assignment according to an example of the present invention.

Please further refer to FIG. 6, which is a schematic diagram of resource assignment according to an example of the present invention. In FIG. 6, the resources of the plurality of PHICHs are still assigned in the region 500 as the example of FIG. 5, but the resources of the plurality of ePHICHs are assigned in a region 602. The region 602 is apart of a region 600 which is assigned to an original PDSCH of the second component carrier CC_2. In other words, the resources for the plurality of PHICHs are assigned as resources for a plurality of PHICHs of the first component carrier CC_1 and the resources for the plurality of ePHICHs are assigned as resources for a PDSCH of the second component carrier CC_2. Therefore, when the network supports CA, the resources of the second component carrier CC_2 can be reused for assigning the resources for the plurality of ePHICH; that is to say, no extra resources are required for the ePHICH design. Besides, the plurality of PHICHs may have higher priority to carry the acknowledgement responses than the plurality of ePHICHs do. Moreover, when the first and second component carriers have the same frequency but different locations, such as coordinated multipoint (CoMP), the assigning method is also suitable.

On the other hand, the network should inform the communication device a configuration of the plurality of PHICHs and the plurality of ePHICHs, such that the communication device can receive the HARQ acknowledgement message according to the configuration after an uplink transmission starts. In detail, the network transmits the configuration by high layer signaling to the communication device. The configuration may include a total group number of the plurality of PHICHs $N_{PHICH}^{group}$, a total group number of the plurality of PHICHs and the plurality of ePHICHs $N_{ePHICH}^{group}$, an uplink resource allocation and a parameter of demodulation reference signals $n_{DMRS}$ which is configured for the uplink transmission. The network calculates a group index $n_{ePHICH}^{group}$ and a sequence index $n_{ePHICH}^{seq}$ according to the configuration, so that the network can transmit the HARQ acknowledgement message on the channel corresponding to the group index $n_{ePHICH}^{seq}$ and the sequence index $n_{ePHICH}^{seq}$. For the same reason, the communication device also calculates the group index $n_{ePHICH}^{group}$ and the sequence index $n_{ePHICH}^{seq}$ according to the configuration, so that the communication device can accurately receive the HARQ acknowledgement message on the channel corresponding to the group index $n_{ePHICH}^{group}$ and the sequence index $n_{ePHICH}^{seq}$. Besides, the channel belongs to the plurality of PHICHs if the group index $n_{ePHICH}^{group}$ is smaller than the total group number of the plurality of PHICHs $n_{PHICH}^{group}$, and the channel belongs to the plurality of ePHICHs if the group index $n_{ePHICH}^{group}$ is greater than or equal to the total group number of the plurality of PHICHs $N_{PHICH}^{group}$. The group index $n_{ePHICH}^{group}$ and the sequence index $n_{ePHICH}^{seq}$ are determined according to the following equations:

$$n_{ePHICH}^{group} = (I_{PRB\_RA}^{lowest\_index} + n_{DMRS}) \bmod N_{ePHICH}^{group} + I_{ePHICH} N_{ePHICH}^{group}$$

$$n_{ePHICH}^{seq} = (\lfloor I_{PRB\_RA}^{lowest\_index} / N_{ePHICH}^{group} \rfloor + n_{DMRS}) \bmod 2N_{SF}^{ePHICH}$$

$$I_{ePHICH} = \begin{cases} 1, & \text{for TDD uplink/downlink configuration 0 with} \\ & \text{PUSCH transmission in subframe } n = 4 \text{ or } 9 \\ 0, & \text{otherwise} \end{cases}$$

$$N_{SF}^{ePHICH} = N_{SF}^{PHICH}$$

$$n_{ePHICH}^{group} = f(m) =$$

$$\begin{cases} n_{ePHICH}^{group} + \lfloor n_{ePHICH}^{group} / N_{PHICH}^{group} \rfloor N_{PHICH}^{group}, & m_i = 2 \text{ \& } I_{ePHICH} = 0 \\ n_{ePHICH}^{group} - (N_{ePHICH}^{group} - N_{PHICH}^{group})(1 - \\ \lfloor n_{ePHICH}^{group} / 2N_{PHICH}^{group} \rfloor), & m_i = 2 \text{ \& } I_{ePHICH} = 1 \\ n_{ePHICH}^{group}, & \text{otherwise} \end{cases}$$

wherein $I_{PRB\_RA}^{lowest\_index}$ denotes the lowest uplink resource block index obtained from the uplink resource allocation, $N_{SF}^{PHICH}$ denotes the spreading factor of the plurality of PHICHs, and $m_i$ denotes the factor of PHICH/ePHICH resource for a subframe i. For a FDD system, $m_i=1$, and for a TDD system, $m_i$ depends on the specified uplink-downlink configuration and the subframe i. Moreover, the network can interleave the plurality of ePHICHs per specific time to change the mapping relationship between the plurality of ePHICHs and the physical resource blocks, so as to improve the accuracy of acknowledgement transmissions.

Note that the equation is an example to obtain the group index $n_{ePHICH}^{group}$ and the sequence index $n_{ePHICH}^{seq}$ according to the configuration, but not limited herein. These skilled in the art can modify the equation according to the relationship between the equation and the configuration. Besides, the equation should collocate with the configuration; that is to say, when one of the configuration and the equation is changed, the other one should be modified as well. In other aspects, the number of the component carriers can be larger than two. In such a situation, the resources of the plurality of ePHICH can be assigned as a combination of resources for a plurality of PHICHs of the component carriers, a combination of resources for a plurality of PDSCHs of the component carriers, or a combination of resources for a plurality of PHICHs of the component carriers and resources for a plurality of PDSCHs of the component carriers.

Figure 7:
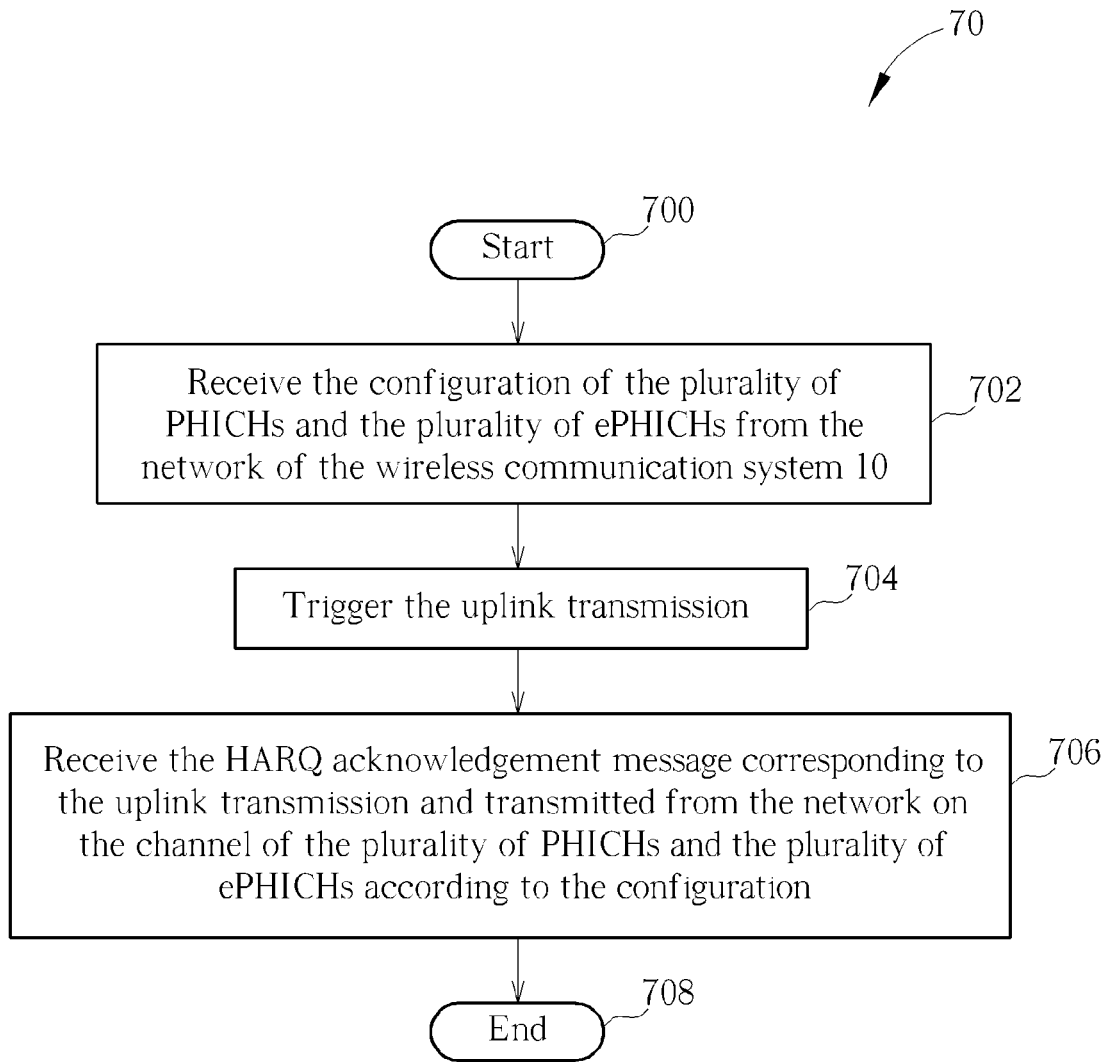
FIG. 7 is a flowchart of a process according to an example of the present invention.

As seen above, the operation of the communication device for handling the HARQ acknowledgement responses can be summarized to a process 70. Please refer to FIG. 7, which is a flowchart of the process 70 according to an example of the present invention. The process 70 can be compiled into the program code 214 and includes the following steps:

Step 700: Start.

Step 702: Receive the configuration of the plurality of PHICHs and the plurality of ePHICHs from the network of the wireless communication system 10.

Step 704: Trigger the uplink transmission.

Step 706: Receive the HARQ acknowledgement message corresponding to the uplink transmission and transmitted from the network on the channel of the plurality of PHICHs and the plurality of ePHICHs according to the configuration.

Step 708: End.

In brief, the communication device receives the configuration of the plurality of PHICHs and the plurality of ePHICHs from the network in order to obtain the channel, so that the communication device can receive the HARQ acknowledgement message on the channel after starting the uplink transmission. Since the plurality of ePHICHs are provided to handle the HARQ acknowledgement transmissions, the capacity of acknowledgement transmissions and the rate of the uplink transmissions are improved.

In the present invention, the network provides the plurality of ePHICHs for transmitting the HARQ acknowledgement message, and assigns the resources for the plurality of ePHICHs based on different scenarios and schedules the configuration to inform the communication device where to receive the corresponding HARQ acknowledgement message. Since the plurality of ePHICHs are provided to carry the HARQ acknowledgement responses, the capacity of the acknowledgement transmissions and the rate of the uplink transmissions can be improved.

To sum up, the present invention provides a method for handling the HARQ acknowledgement responses via a plurality of ePHICHs, to increase the capacity of acknowledgement transmissions, and further improve the rate of uplink transmissions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling hybrid automatic repeat request (HARQ) acknowledgement responses in a network of a wireless communication system, the method comprising:
assigning resources for a plurality of physical hybrid indicator channels (PHICHs) and a plurality of extended physical hybrid indicator channels (ePHICHs); and
transmitting a HARQ acknowledgement message to a communication device of the wireless communication system on a channel selected from the plurality of PHICHs and the plurality of ePHICHs, after receiving an uplink transmission from the communication device, wherein the HARQ acknowledgement message is transmitted via the plurality of PHICHs if a group index is smaller than a total group number of the plurality of PHICHs, and the HARQ acknowledgement message is transmitted via the plurality of ePHICHs if the group index is greater than or equal to the total group number of the plurality of PHICHs;
wherein the group index is calculated from a total group number of the plurality of PHICHs and the plurality of ePHICHs, and the total group number of the plurality of PHICHs and the plurality of ePHICHs is indicated by the network.

2. The method of claim 1, wherein the channel is selected from the plurality of PHICHs when the plurality of PHICHs are available.

3. The method of claim 1, wherein assigning the resources for the plurality of PHICHs and the plurality of ePHICHs comprises assigning a region of a physical downlink shared channel as the resources for the plurality of ePHICHs.

4. The method of claim 1, wherein the network comprises a first component carrier and at least a second component carrier.

5. The method of claim 4, wherein assigning the resources for the plurality of PHICHs and the plurality of ePHICHs comprises:
assigning the resources for the plurality of PHICHs and the plurality of ePHICHs to the first component carrier;
assigning the resources for the plurality of PHICHs as resources for a plurality of PHICHs of the first component carrier; and
assigning the resources for the plurality of ePHICHs as resources for the plurality of PHICHs of at least the second component carrier.

6. The method of claim 4, wherein assigning the resources for the plurality of PHICHs and the plurality of ePHICHs comprises:
assigning the resources for the plurality of PHICHs and the plurality of ePHICHs to the first component carrier;
assigning the resources for the plurality of PHICHs as resources for a plurality of PHICHs of the first component carrier; and
assigning the resources for the plurality of ePHICHs as resources for a physical downlink shared channel of at least the second component carrier.

7. The method of claim 4, wherein the first component carrier and at least the second component carrier have different frequencies.

8. The method of claim 4, wherein the first component carrier and at least the second component carrier have the same frequency but different locations.

9. The method of claim 1, further comprising generating and sending a configuration of the plurality of PHICHs and the plurality of ePHICHs to the communication device before transmitting the HARQ acknowledgement message to the communication device, such that the communication device is capable of receiving the HARQ acknowledgement message via the channel.

10. The method of claim 9, wherein the configuration comprises the total group number of the plurality of PHICHs, the total group number of the plurality of PHICHs and the plurality of ePHICHs, an uplink resource allocation or a parameter of demodulation reference signals which is configured for the uplink transmission.

11. The method of claim 9, wherein the communication device calculates the group index and a sequence index according to the configuration.

12. The method of claim 10, wherein the total group number of the plurality of PHICHs, the total group number of the plurality of PHICHs and the plurality of ePHICHs, a spreading factor of the plurality of PHICHs, the uplink resource allocation and the parameter of demodulation reference signals are assigned by the network and signaled by higher layer signaling.

13. The method of claim 11, wherein the group index and the sequence index are determined according to the following equations:

$$n_{ePHICH}^{group} = (I_{PRB\_RA}^{lowest\_index} + n_{DMRS}) \bmod N_{ePHICH}^{group} + I_{ePHICH} N_{ePHICH}^{group}$$

$$n_{ePHICH}^{seq} = (\lfloor I_{PRB\_RA}^{lowest\_index} / N_{ePHICH}^{group} \rfloor + n_{DMRS}) \bmod 2N_{SF}^{ePHICH}$$

$$I_{ePHICH} = \begin{cases} 1, \text{ for } TDD \text{ uplink/downlink configuration 0 with } PUSCH \text{ transmission } insubframe\ n = 4 \text{ or } 9 \\ 0, \text{ otherwise} \end{cases}$$

$$N_{ePHICH}^{group} = N_{PHICH}^{group}$$

$$n_{ePHICH}^{group} = f(m) = \begin{cases} n_{ePHICH}^{group} + \lfloor n_{ePHICH}^{group}/N_{PHICH}^{group} \rfloor N_{PHICH}^{group}, m_i = 2\ \&\ I_{ePHICH} = 0 \\ n_{ePHICH}^{group} - (N_{ePHICH}^{group} - N_{PHICH}^{group})(1 - \lfloor n_{ePHICH}^{group}/2N_{PHICH}^{group} \rfloor), m_i = 2\ \&\ I_{ePHICH} = 1 \\ n_{ePHICH}^{group}, \text{ otherwise} \end{cases}$$

wherein $n_{ePHICH}^{group}$ denotes the group index, $n_{ePHICH}^{seq}$ denotes the sequence index, $N_{PHICH}^{group}$ denotes the total group number of the plurality of PHICHs, $N_{ePHICH}^{group}$ denotes the total group number of the plurality of PHICHs and the plurality of ePHICHs, $N_{SF}^{PHICH}$ denotes a spreading factor of the plurality of PHICHs, $I_{PRB\_RA}^{lowest\_index}$ denotes a lowest uplink resource block index used for the corresponding uplink transmission, $n_{DMRS}$ denotes the parameter of demodulation reference signals which is configured for the uplink transmission, and $m_i$ denotes a factor of PHICH/ePHICH resource for a subframe i; wherein for a FDD system, $m_i=1$, and for a TDD system, $m_i$ depends on a specified uplink-downlink configuration and the subframe i.

14. The method of claim 1, wherein an interleaving operation is performed in the plurality of ePHICHs.

15. The method of claim 1, wherein the HARQ acknowledgement responses are a positive HARQ acknowledgement response and a negative HARQ acknowledgement response.

16. A method of handling hybrid automatic repeat request (HARQ) acknowledgement responses in a communication device of a wireless communication system, the method comprising:
receiving a configuration of a plurality of PHICHs and a plurality of ePHICHs from a network of the wireless communication system;
triggering an uplink transmission; and
receiving a HARQ acknowledgement message corresponding to the uplink transmission and transmitted from the network on a channel of the plurality of PHICHs and the plurality of ePHICHs according to the configuration, wherein the HARQ acknowledgement message is received via the plurality of PHICHs if a group index is smaller than a total group number of the plurality of PHICHs, and the HARQ acknowledgement message is received via the plurality of ePHICHs if the group index is greater than or equal to the total group number of the plurality of PHICHs;
wherein the group index is calculated from a total group number of the plurality of PHICHs and the plurality of ePHICHs, and the total group number of the plurality of PHICHs and the plurality of ePHICHs is indicated by the network.

17. The method of claim 16, wherein the configuration comprises the total group number of the plurality of PHICHs, the total group number of the plurality of PHICHs and the plurality of ePHICHs, an uplink resource allocation and a parameter of demodulation reference signals which is configured for the uplink transmission.

18. The method of claim 17, wherein the total group number of the plurality of PHICHs, the total group number of the plurality of PHICHs and the plurality of ePHICHs, a spreading factor of the plurality of PHICHs, the uplink resource allocation and the parameter of demodulation reference signals are assigned by the network and signaled by higher layer signaling.

19. The method of claim 16, wherein the communication device calculates the group index and a sequence index according to the configuration.

20. The method of claim 19, wherein the group index and the sequence index are determined according to the following equations:

$$n_{ePHICH}^{group} = (I_{PRB\_RA}^{lowest\_index} + n_{DMRS}) \bmod N_{ePHICH}^{group} + I_{ePHICH} N_{ePHICH}^{group}$$

$$n_{ePHICH}^{seq} = (\lfloor I_{PRB\_RA}^{lowest\_index} / N_{ePHICH}^{group} \rfloor + n_{DMRS}) \bmod 2N_{SF}^{ePHICH}$$

$$I_{ePHICH} = \begin{cases} 1, \text{ for } TDD \text{ uplink/downlink configuration 0 with } PUSCH \text{ transmission } insubframe\ n = 4 \text{ or } 9 \\ 0, \text{ otherwise} \end{cases}$$

$$N_{ePHICH}^{group} = N_{PHICH}^{group}$$

-continued $$n_{ePHICH}^{group} = f(m) = \begin{cases} n_{ePHICH}^{group} + \lfloor n_{ePHICH}^{group}/N_{PHICH}^{group} \rfloor N_{PHICH}^{group}, & m_i = 2 \ \& \ I_{ePHICH} = 0 \\ n_{ePHICH}^{group} - (N_{ePHICH}^{group} - N_{PHICH}^{group})(1 - \lfloor n_{ePHICH}^{group}/2N_{PHICH}^{group} \rfloor), & m_i = 2 \ \& \ I_{ePHICH} = 1 \\ n_{ePHICH}^{group}, & \text{otherwise} \end{cases}$$

wherein $n_{ePHICH}^{group}$ denotes the group index, $n_{ePHICH}^{seq}$ denotes the sequence index, $N_{PHICH}^{group}$ denotes the total group number of the plurality of PHICHs, $N_{ePHICH}^{group}$ denotes the total group number of the plurality of PHICHs and the plurality of ePHICHs, $N_{SF}^{PHICH}$ denotes a spreading factor of the plurality of PHICHs, $I_{PRB\_RA}^{lowest\_index}$ denotes a lowest uplink resource block index used for the corresponding uplink transmission, $n_{DMRS}$ denotes the parameter of demodulation reference signals which is configured for the uplink transmission, and $m_i$ denotes a factor of PHICH/ePHICH resource for a subframe i;

wherein for a FDD system, $m_i=1$, and for a TDD system, $m_i$ depends on a specified uplink-downlink configuration and the subframe i.

21. The method of claim 16, wherein an interleaving operation is performed in the plurality of ePHICHs.

22. The method of claim 16, wherein the HARQ acknowledgement responses comprise a positive HARQ acknowledgement response and a negative HARQ acknowledgement response.

23. A communication apparatus for a network of a wireless communication system, comprising:
a processing unit;
a storage unit; and
a program code, stored in the storage unit, wherein the program code instructs the processing unit to execute the following steps:
assigning resources for a plurality of physical hybrid indicator channels (PHICHs) and a plurality of extended physical hybrid indicator channels (ePHICHs); and
transmitting a HARQ acknowledgement message to a communication device of the wireless communication system on a channel selected from the plurality of PHICHs and the plurality of ePHICHs, after receiving an uplink transmission from the communication device, wherein the HARQ acknowledgement message is transmitted via the plurality of PHICHs if a group index is smaller than a total group number of the plurality of PHICHs, and the HARQ acknowledgement message is transmitted via the plurality of ePHICHs if the group index is greater than or equal to the total group number of the plurality of PHICHs;
wherein the group index is calculated from a total group number of the plurality of PHICHs and the plurality of ePHICHs, and the total group number of the plurality of PHICHs and the plurality of ePHICHs is indicated by the network.

24. The communication apparatus of claim 23, wherein the channel is selected from the plurality of PHICHs when the plurality of PHICHs are available.

25. The communication apparatus of claim 23, wherein the step of assigning the resources for the plurality of PHICHs and the plurality of ePHICHs comprises assigning a region of a physical downlink shared channel as the resources for the plurality of ePHICHs.

26. The communication apparatus of claim 23, wherein a first component carrier and at least a second component carrier are configured.

27. The communication apparatus of claim 26, wherein the step of assigning the resources for the plurality of PHICHs and the plurality of ePHICHs comprises:
assigning the resources for the plurality of PHICHs and the plurality of ePHICHs to the first component carrier;
assigning the resources for the plurality of PHICHs as resources for a plurality of PHICHs of the first component carrier; and
assigning the resources for the plurality of ePHICHs as resources for the plurality of PHICHs of at least the second component carrier.

28. The communication apparatus of claim 26, wherein the step of assigning the resources for the plurality of PHICHs and the plurality of ePHICHs comprises:
assigning the resources for the plurality of PHICHs and the plurality of ePHICHs to the first component carrier;
assigning the resources for the plurality of PHICHs as resources for a plurality of PHICHs of the first component carrier; and
assigning the resources for the plurality of ePHICHs as resources for a physical downlink shared channel of at least the second component carrier.

29. The communication apparatus of claim 26, wherein the first component carrier and at least the second component carrier have different frequencies.

30. The communication apparatus of claim 26, wherein the first component carrier and at least the second component carrier have the same frequency but different locations.

31. The communication apparatus of claim 23, wherein the program code further instructs the processing unit to execute the step of generating and sending a configuration of the plurality of PHICHs and the plurality of ePHICHs to the communication device before transmitting the HARQ acknowledgement message to the communication device, such that the communication device is capable of receiving the HARQ acknowledgement message via the channel.

32. The communication apparatus of claim 31, wherein the configuration comprises the total group number of the plurality of PHICHs, the total group number of the plurality of PHICHs and the plurality of ePHICHs, an uplink resource allocation or a parameter of demodulation reference signals which is configured for the uplink transmission.

33. The communication apparatus of claim 31, wherein the communication device calculates the group index and a sequence index according to the configuration.

34. The communication apparatus of claim 32, wherein the total group number of the plurality of PHICHs, the total group number of the plurality of PHICHs and the plurality of ePHICHs, the uplink resource allocation and the parameter of demodulation reference signals are assigned and signaled by higher layer signaling.

35. The communication apparatus of claim 33, wherein the group index and the sequence index are determined according to the following equations:

$$n_{ePHICH}^{group} = (I_{PRB\_RA}^{lowest\_index} + n_{DMRS}) \bmod N_{ePHICH}^{group} + I_{ePHICH} N_{ePHICH}^{group}$$

$$n_{ePHICH}^{seq} = (\lfloor I_{PRB\_RA}^{lowest\_index} / N_{ePHICH}^{group} \rfloor + n_{DMRS}) \bmod 2N_{SF}^{ePHICH}$$

$$I_{ePHICH} = \begin{cases} 1, \text{ for } TDD \text{ uplink/downlink configuration } 0 \text{ with } PUSCH \text{ transmission } \textit{insubframe } n = 4 \text{ or } 9 \\ 0, \text{ otherwise} \end{cases}$$

$$N_{ePHICH}^{group} = N_{PHICH}^{group}$$

$$n_{ePHICH}^{group} = f(m) = \begin{cases} n_{ePHICH}^{group} + \lfloor n_{ePHICH}^{group} / N_{PHICH}^{group} \rfloor N_{PHICH}^{group}, m_i = 2 \text{ \& } I_{ePHICH} = 0 \\ n_{ePHICH}^{group} - (N_{ePHICH}^{group} - N_{PHICH}^{group})(1 - \lfloor n_{ePHICH}^{group} / 2N_{PHICH}^{group} \rfloor), m_i = 2 \text{ \& } I_{ePHICH} = 1 \\ n_{ePHICH}^{group}, \text{ otherwise} \end{cases}$$

wherein $n_{ePHICH}^{group}$ denotes the group index, $n_{ePHICH}^{seq}$ denotes the sequence index, $N_{PHICH}^{group}$ denotes the total group number of the plurality of PHICHs, $N_{ePHICH}^{group}$ denotes the total group number of the plurality of PHICHs and the plurality of ePHICHs, $N_{SF}^{PHICH}$ denotes a spreading factor of the plurality of PHICHs, $I_{PRB\_RA}^{lowest\_index}$ denotes a lowest uplink resource block index used for the corresponding uplink transmission, $n_{DMRS}$ denotes the parameter of demodulation reference signals which is configured for the uplink transmission, and $m_i$ denotes a factor of PHICH/ePHICH resource for a subframe i;
wherein for a FDD system, $m_i=1$, and for a TDD system, $m_i$ depends on a specified uplink-downlink configuration and the subframe i.

36. The communication apparatus of claim 23, wherein an interleaving operation is performed in the plurality of ePHICHs.

37. The communication apparatus of claim 23, wherein the HARQ acknowledgement responses are a positive HARQ acknowledgement response and a negative HARQ acknowledgement response.

38. A communication apparatus for a wireless communication system, comprising:
a processing unit;
a storage unit; and
a program code, stored in the storage unit, wherein the program code instructs the processing unit to execute the following steps:
receiving a configuration of a plurality of PHICHs and a plurality of ePHICHs from a network of the wireless communication system;
triggering an uplink transmission; and
receiving a HARQ acknowledgement message corresponding to the uplink transmission and transmitted from the network on a channel of the plurality of PHICHs and the plurality of ePHICHs according to the configuration, wherein the HARQ acknowledgement message is received via the plurality of PHICHs if a group index is smaller than a total group number of the plurality of PHICHs, and the HARQ acknowledgement message is received via the plurality of ePHICHs if the group index is greater than or equal to the total group number of the plurality of PHICHs;
wherein the group index is calculated from a total group number of the plurality of PHICHs and the plurality of ePHICHs, and the total group number of the plurality of PHICHs and the plurality of ePHICHs is indicated by the network.

39. The communication apparatus of claim 38, wherein the configuration comprises the total group number of the plurality of PHICHs, the total group number of the plurality of PHICHs and the plurality of ePHICHs, an uplink resource allocation and a parameter of demodulation reference signals which is configured for the uplink transmission.

40. The communication apparatus of claim 39, wherein the total group number of the plurality of PHICHs, the total group number of the plurality of PHICHs and the plurality of ePHICHs, the uplink resource allocation and the parameter of demodulation reference signals are assigned by the network and signaled by higher layer signaling.

41. The communication apparatus of claim 38, wherein the program code instructs the processing unit to calculate the group index and a sequence index according to the configuration.

42. The communication apparatus of claim 41, wherein the group index and the sequence index are determined according to the following equations:

$$n_{ePHICH}^{group} = (I_{PRB\_RA}^{lowest\_index} + n_{DMRS}) \bmod N_{ePHICH}^{group} + I_{ePHICH} N_{ePHICH}^{group}$$

$$n_{ePHICH}^{seq} = (\lfloor I_{PRB\_RA}^{lowest\_index} / N_{ePHICH}^{group} \rfloor + n_{DMRS}) \bmod 2N_{SF}^{ePHICH}$$

$$I_{ePHICH} = \begin{cases} 1, \text{ for } TDD \text{ uplink/downlink configuration } 0 \text{ with } PUSCH \text{ transmission } \textit{insubframe } n = 4 \text{ or } 9 \\ 0, \text{ otherwise} \end{cases}$$

$$N_{ePHICH}^{group} = N_{PHICH}^{group}$$

$$n_{ePHICH}^{group} = f(m) = \begin{cases} n_{ePHICH}^{group} + \lfloor n_{ePHICH}^{group} / N_{PHICH}^{group} \rfloor N_{PHICH}^{group}, m_i = 2 \text{ \& } I_{ePHICH} = 0 \\ n_{ePHICH}^{group} - (N_{ePHICH}^{group} - N_{PHICH}^{group})(1 - \lfloor n_{ePHICH}^{group} / 2N_{PHICH}^{group} \rfloor), m_i = 2 \text{ \& } I_{ePHICH} = 1 \\ n_{ePHICH}^{group}, \text{ otherwise} \end{cases}$$

wherein $n_{ePHICH}^{group}$ denotes the group index, $n_{ePHICH}^{seq}$ denotes the sequence index, $N_{PHICH}^{group}$ denotes the total group number of the plurality of PHICHs, $N_{ePHICH}^{group}$ denotes the total group number of the plurality of PHICHs and the plurality of ePHICHs, $N_{SF}^{PHICH}$ denotes a spreading factor of the plurality of PHICHs, $I_{PRB\_RA}^{lowest\_index}$ denotes a lowest uplink resource block index used for the corresponding uplink transmission, $n_{DMRS}$ denotes the parameter of demodulation reference signals which is configured for the uplink transmission, and $m_i$ denotes a factor of PHICH/ePHICH resource for a subframe i;

wherein for a FDD system, $m_i=1$, and for a TDD system, $m_i$ depends on a specified uplink-downlink configuration and the subframe i.

43. The communication apparatus of claim 38, wherein an interleaving operation is performed in the plurality of ePHICHs.

44. The communication apparatus of claim 38, wherein the HARQ acknowledgement responses comprise a positive HARQ acknowledgement response and a negative HARQ acknowledgement response.

\* \* \* \* \*